Jan. 8, 1929.         C. J. HENRYSON         1,697,977
LINE HANGER
Filed March 3, 1927
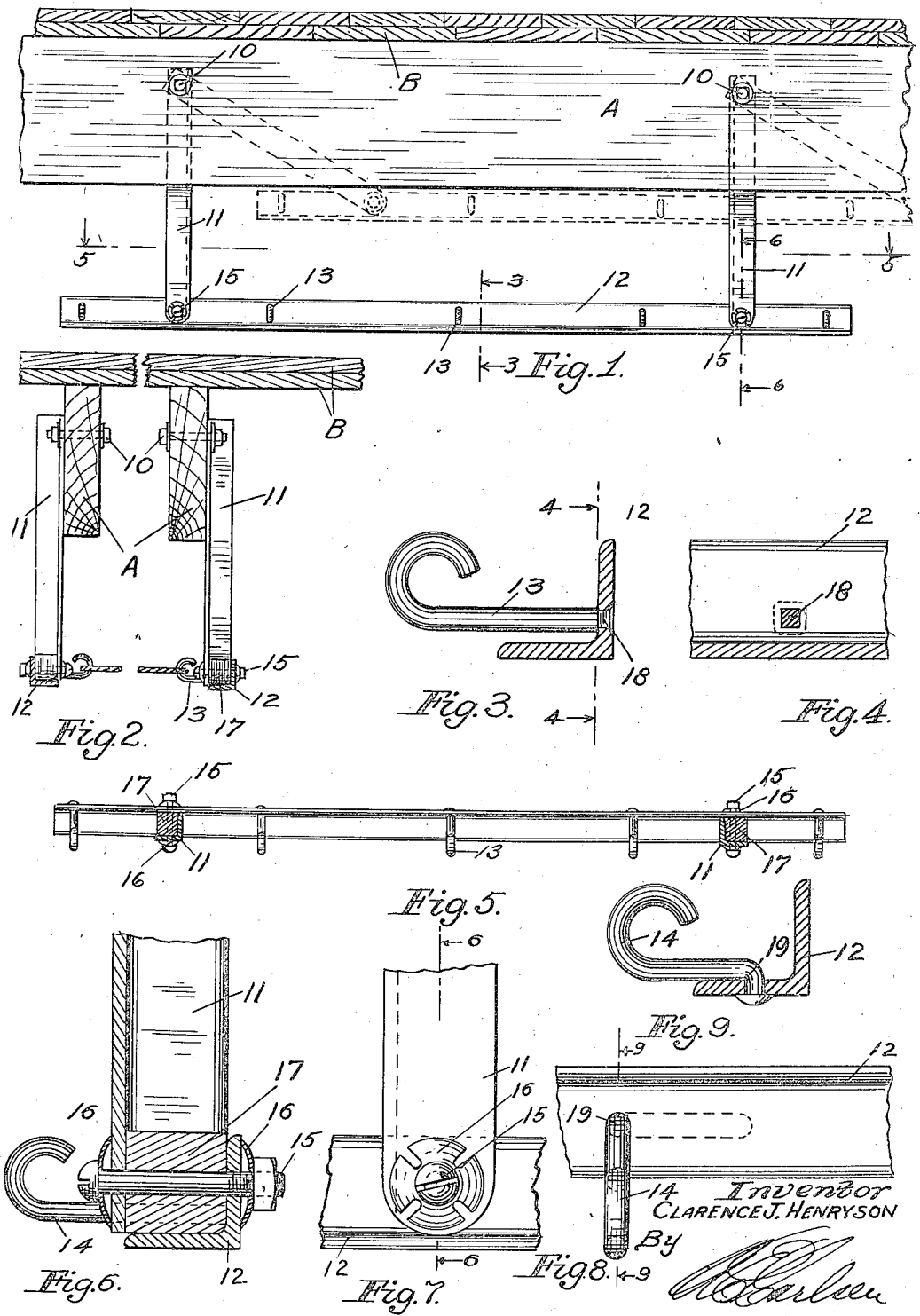
Inventor
CLARENCE J. HENRYSON
By
Attorney Patented Jan. 8, 1929.

1,697,977

UNITED STATES PATENT OFFICE.

CLARENCE J. HENRYSON, OF ST. PAUL, MINNESOTA.

LINE HANGER.

Application filed March 3, 1927. Serial No. 172,538.

This invention relates to clothes line hangers, and the main object is to provide means of a simple, efficient, and practical nature for supporting clothes lines and the like, whereby such lines may, without being disconnected, be swung up into an out of the way position such as is desired, for instance in basements, where head room is needed when the lines are not in use. Further and more specific objects will be disclosed in the course of the following specification, reference being had to the accompanying drawing, in which:

Fig. 1 is an elevation of the device, as applied to a floor joist above a basement, two of such devices being used in parallel spaced relation with respect to each other.

Fig. 2 is an end view of a pair of the devices indicating their respective positions, showing the adjacent ceiling construction, partly in section and partly broken away.

Fig. 3 is an enlarged detail section on the line 3—3 in Fig. 1.

Fig. 4 is a sectional view on the line 4—4 in Fig. 3.

Fig. 5 is a sectional plan view on the line 5—5 in Fig. 1.

Fig. 6 is an enlarged detail view on the line 6—6 in Fig. 1, or as on the line 6—6 in Fig. 7.

Fig. 7 is a detail view as seen from the left in Fig. 6.

Fig. 8 is an enlarged fractional detail view of the bar as shown in Fig. 5, but showing a modified form of the line hook.

Fig. 9 is a detail perspective section on the line 9—9 in Fig. 8.

Referring to the drawing more particularly and by reference characters A designates the ceiling beams or floor joists as usually found in the basements of homes, and B designates the floor boards supported by these beams. The beams or rafters present the most convenient form of support for my device, although similar supports located elsewhere than in a basement may obviously be utilized equally well.

Upon the outer faces of each of two of such supports A, I pivotally secure, as by bolts 10, a pair of depending angle iron links 11, the lower ends of which are connected by a horizontal angle iron bar 12, having hooks 13 (or 14) to which the clothes lines are hitched or tied. It may be noted that the bolts 10 are sufficiently high so that the lower portion of the joist A acts as a substantial brace for the links 11, which are pulled, by the lines, against the joist, thus rendering the support very rigid when in use. When the device is not in use it is swung up into the position indicated by dotted lines in Fig. 1, and to do this it is of course not necessary to remove or loosen the lines carried by the cross bars 12.

While the pivot connections between the cross bar 12 and the depending links 11 may be of any suitable construction, I have illustrated a preferred form, which may be described as follows: The members 11 and 12 are pivotally connected, at each joint, with a bolt 15, the same having a spring acting washer 16 on one or both ends, whereby enough friction may be created to hold the device in the upper dotted line position shown in Fig. 1, where it must be held when out of use. The vertical flange of the bar 12 preferably abuts or bears against the edge of the adjacent flange of each link 11, so as to relieve the bolt 15 and washers 16 from any of the pulling strain resulting from the tension of the lines or the weight of the clothes. But to prevent any distorting tendency of such tension I find it preferable to insert a small block 17 between the parallel flanges of the members 11 and 12.

If hooks such as 13 are employed they are provided with reduced non-circular portions 18, which are riveted into the vertical flange of the bar 12, thus rendering them rigid with the bar. The hooks, such as 14, are provided with angular extensions 19, which are riveted to the horizontal flanges, but these hooks are preferably loose enough to permit them to be swung into the dotted line position shown in Fig. 8, thus rendering the device more compact for shipping purposes.

It is understood that suitable modifications may be made in the general design and structural details of the invention as herein shown and described, provided, however, that said modifications come within the spirit and scope of the appended claims. Having now therefore fully shown and described my invention, what I claim to be new and desire to protect by Letters Patent is:

1. A line hanger comprising a pair of parallel bars between which lines are stretched, a pair of normally depending links supporting each bar, said links being pivotally secured at their lower ends to the bar and adapted to be pivotally secured at their upper ends to a rigid support, whereby the bars may be individually swung up, in their vertical planes parallel to each other, to collapsed positions, when not in use.

2. A line hanger comprising a pair of parallel bars between which lines are stretched, a pair of normally depending links supporting each bar, said links being pivotally secured at their lower ends to the bar and adapted to be pivotally secured at their upper ends to a rigid support, whereby the bars may be individually swung up parallel to each other, to collapsed positions, said links being arranged to bear against the supports whereby to brace the bars against the pull of the lines stretched therebetween.

In testimony whereof I affix my signature.

CLARENCE J. HENRYSON.